United States Patent [19]

Schatz

[11] Patent Number: 5,089,246
[45] Date of Patent: Feb. 18, 1992

[54] PROCESS FOR CONVERTING CARBON DISULFIDE TO HYDROGEN SULFIDE IN HYDROGEN SULFIDE/CARBON DISULFIDE MIXTURES

[75] Inventor: George R. Schatz, Berwyn, Pa.

[73] Assignee: Atochem North America, Inc., Philadelphia, Pa.

[21] Appl. No.: 617,821

[22] Filed: Nov. 26, 1990

Related U.S. Application Data

[63] Continuation-in-part of Ser. No. 472,003, Jan. 29, 1990, abandoned.

[51] Int. Cl.$^5$ .............................................. C01B 17/16
[52] U.S. Cl. .................................. 423/563; 423/437; 423/572
[58] Field of Search .................. 423/563, 437 R, 572

[56] References Cited

U.S. PATENT DOCUMENTS

| | | |
|---|---|---|
| 2,857,250 | 10/1958 | Timmerman et al. |
| 2,882,130 | 4/1959 | Porter |
| 2,882,131 | 4/1959 | Getz et al. |
| 3,079,233 | 2/1963 | Wenzke |
| 3,189,406 | 6/1965 | Sharp et al. |
| 4,094,961 | 6/1978 | Beavon |
| 4,146,580 | 3/1979 | Beavon |
| 4,332,774 | 6/1982 | Drum et al. |
| 4,332,781 | 7/1969 | Kerr |
| 4,404,180 | 9/1983 | Drum et al. |
| 4,695,443 | 9/1987 | Leon |
| 4,981,661 | 1/1991 | Borsboom et al. ........... 423/563 |

FOREIGN PATENT DOCUMENTS 2574310 6/1986 France.

OTHER PUBLICATIONS

Crane et al., "Hydrogen Sulfide Generation by Reaction of Natural Gas, Sulfur and Steam", Bureau of Mines Report of Investigations, 1981, RI 8539.
Proceedings: Symposium on Flue Gas Desulfurization—New Orleans, Mar. 1976, vol. II (U.S. Dept. of Commerce, Natl. Tech. Inf. Svc.).
Bacon et al., "Hydrogen Sulfide Production from Sulfur and Hydrocarbons", Industrial and Engineering Chemistry, vol. 37, No. 5, pp. 469-474.

Primary Examiner—Wayne A. Langel
Attorney, Agent, or Firm—Seidel, Gonda, Lavorgna & Monaco

[57] ABSTRACT

A process for converting carbon disulfide ($CS_2$) to hydrogen sulfide ($H_2S$) in mixtures of $H_2S$ and $CS_2$ is provided. The $H_2S/CS_2$ mixture is combined with water to form a hydrolysis feed mixture. The hydrolysis feed mixture is passed through a hydrolysis reactor containing e.g., an alumina-based catalyst, wherein a substantial portion of the $CS_2$ is converted to additional $H_2S$. A vapor product comprising $H_2S$, $CO_2$, unreacted $H_2O$, unconverted $CS_2$ and sulfur is formed by the hydrolysis reaction. The vapor product is cooled to form a $H_2S/CO_2$ vapor phase and a sour water condensate phase. The $H_2S/CO_2$ vapor phase is separated from the sour water condensate phase and subsequently recovered. The sour water condensate phase, which contains small amounts of solid sulfur particles, is optionally then combined with additional $CS_2$ and decanted to form a sulfur-free sour water layer and a $CS_2$ layer containing dissolved sulfur. The sour water layer is recycled and combined with the original $H_2S/CS_2$ mixture. The $CS_2$ layer is recycled to a sulfur removal device to remove the sulfur dissolved in the $CS_2$.

28 Claims, 1 Drawing Sheet

PROCESS FOR CONVERTING CARBON DISULFIDE TO HYDROGEN SULFIDE IN HYDROGEN SULFIDE/CARBON DISULFIDE MIXTURES

This is a continuation-in-part of my co-pending application Ser. No. 472,003, filed Jan. 29, 1990, abandoned.

FIELD OF THE INVENTION

The invention relates generally to a process for converting carbon disulfide ($CS_2$) to hydrogen sulfide ($H_2S$) by hydrolysis. In particular, the invention relates o a two stage process wherein $H_2S$ and $CS_2$ are manufactured by the reaction of natural gas and excess sulfur in a first stage, and $CS_2$ is then converted to additional $H_2S$ by hydrolysis of the $CS_2$ in a second stage.

BACKGROUND OF THE INVENTION

The manufacture of $H_2S$ from the reaction of natural gas (i.e., primarily methane) and sulfur is known The reaction products ($H_2S$, $CS_2$ and unreacted sulfur) are formed when methane and excess sulfur are converted at elevated temperature according to the reaction of equation (I):

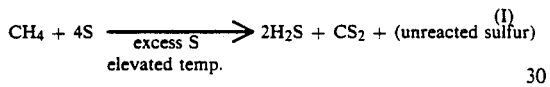

A one-step process for manufacturing $H_2S$ from natural gas, sulfur and steam is also known. The components are all combined to form $H_2S$ and carbon dioxide ($CO_2$) according to the reaction of equation (II):

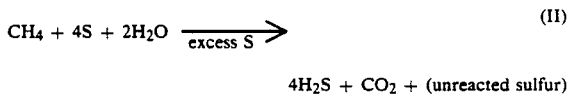

$$4H_2S + CO_2 + \text{(unreacted sulfur)}$$

Major disadvantages of the one-step process of equation (II) include:
(1) The subsequent removal of unreacted sulfur from the other reaction co-products is often difficult. Removal of unreacted sulfur by solidification and remelting, in downstream condensers, is often incomplete, resulting in equipment plugging.
(2) The process fails to provide a means for condensing and recycling excess water. As a result, the excess water is limited to the amount of water vapor that leaves with the vapor reaction products (usually about a 25 wt. % excess). This condition produces fairly high quantities of COS (e.g., 0.58 wt. %) in the $H_2S/CO_2$ reaction product stream.
(3) The process increases equipment corrosion due to the presence of water vapor at elevated temperature (i.e., 1150° F./621° C.). The process does not provide a way of reducing the reaction temperature to a value where corrosion is minimized (i.e., 700° F./371° C.).

Once the reaction of equation (I) takes place, $H_2S$ may be recovered from its gaseous mixture with $CS_2$ by converting $CS_2$ to additional $H_2S$ in a fixed bed hydrolysis reactor. It is possible by hydrolysis with steam to convert almost all of the $CS_2$ (to a total concentration of up to 6 volume percent $CS_2$) found in the gaseous mixture consisting mostly of $H_2S$. The conversion takes place according to the reaction of equation (III):

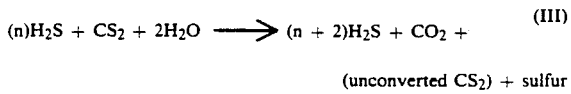

A catalyst is often used in the fixed bed hydrolysis reactor to catalyze the above reaction. The hydrolysis reaction is highly exothermic and takes place in the absence of oxygen. Reactor outlet temperatures well in excess of 700° F./371° C. are possible. However, in situations where the $CS_2$ concentration is often in excess of 6 volume percent, the above-identified hydrolysis process is not workable since large excesses of water are required to control the hydrolysis reaction outlet temperature. Moreover, the small amounts of sulfur which are formed in $CS_2$ hydrolysis must be subsequently removed in order to avoid equipment plugging.

Clearly what is needed is a process capable of converting $CS_2$ to additional $H_2S$ in a $H_2S/CS_2$ mixture which does not have the disadvantages inherent in the prior art. The process should permit substantially complete conversion of $CS_2$ to $H_2S$ under conditions which minimize COS formation, energy expenditures, and equipment plugging. Conversion should take place where high concentrations of $CS_2$ are present within the $H_2S$ (>>6 vol.% $CS_2$). In particular, conversion of $CS_2$ to $H_2S$ by hydrolysis should be conducted under conditions where a relatively low temperature (i.e., 700° F./371° C.) is maintained at the outlet of the hydrolysis reactor so that the reactor also converts COS to additional $H_2S$ and so that equipment corrosion is minimized.

Other objects and advantages of the present invention will become apparent to those skilled in the art with reference to the attached drawing and the description of the invention which hereinafter follows.

SUMMARY OF THE INVENTION

A process for converting $CS_2$ to $H_2S$ by hydrolysis is provided. In general, the invention relates to a one stage process for converting $CS_2$ to $H_2S$ by hydrolysis comprising the steps of:
(a) combining $CS_2$ or a $H_2S/CS_2$ mixture with water to form a feed mixture;
(b) converting a substantial portion of the $CS_2$ in the mixture by hydrolysis to a hydrolysis reaction vapor product comprising $H_2S$, $CO_2$, sulfur and unconverted $CS_2$; and
(c) cooling the hydrolysis reaction vapor product to form a $H_2S/CO_2$ vapor phase and a sour water condensate phase; and
(d) separating the $H_2S/CO_2$ vapor phase from the sour water condensate phase.

In another aspect, the invention relates to a two stage process comprising the steps of:
(a) reacting natural gas with excess sulfur at elevated temperature to form a $H_2S/CS_2$ reaction product comprising $H_2S$, $CS_2$ and unreacted sulfur;
(b) removing the unreacted sulfur from the $H_2S/CS_2$ reaction product to form a substantially desulfurized $H_2S/CS_2$ mixture;
(c) combining the substantially desulfurized $H_2S/CS_2$ mixture with water to form a feed mixture;
(d) converting a substantial portion of the $CS_2$ in the feed mixture by hydrolysis to a hydrolysis reaction vapor product comprising H$_2$S, CO$_2$, sulfur and unconverted CS$_2$;

(e) cooling the hydrolysis reaction vapor product to form a H$_2$S/CO$_2$ vapor phase and a sour water condensate phase; and (f) separating the H$_2$S/CO$_2$ vapor phase from the sour water condensate phase.

According to a preferred embodiment, the sour water condensate phase, following separation from the H$_2$S/CO$_2$ vapor phase, is further processed according to the steps of:

mixing the sour water condensate with additional CS$_2$ to form a sour water phase and a CS$_2$ phase containing dissolved sulfur;

separating the sour water phase from the CS$_2$ phase; and recycling the sour water phase to the H$_2$S/CS$_2$ mixture in step (a), above.

According to yet another preferred embodiment, the step of cooling the hydrolysis reaction vapor product to form the H$_2$S/CO$_2$ vapor phase and sour water vapor condensate phase comprises:

(i) cooling the hydrolysis reaction vapor product in a first cooling step to a temperature greater than the solidification point of sulfur; and (ii) cooling the vapor product in a second cooling step to a temperature no lower than about 30° C. to form a H$_2$S/CO$_2$ vapor phase and sour water condensate phase.

Most preferably, the hydrolysis reaction vapor product is cooled in the first cooling step by passing the vapor product into heat exchange contact with the process feed mixture, which mixture comprises H$_2$S, CS$_2$ and sour water condensate.

As used herein, "sour water" means water which contains some soluble H$_2$S therein. By "unadulterated water" is meant substantially pure water, as distinguished from sour water. As used herein, "substantially desulfurized" means removing the major portion of unreacted sulfur from a reaction product. As used herein, "substantially sulfur-free" means removing all or substantially all sulfur from a product. And as used herein, "solidification point of sulfur" means the temperature at which liquid sulfur starts to become solid.

DETAILED DESCRIPTION OF THE INVENTION

Figure 1:
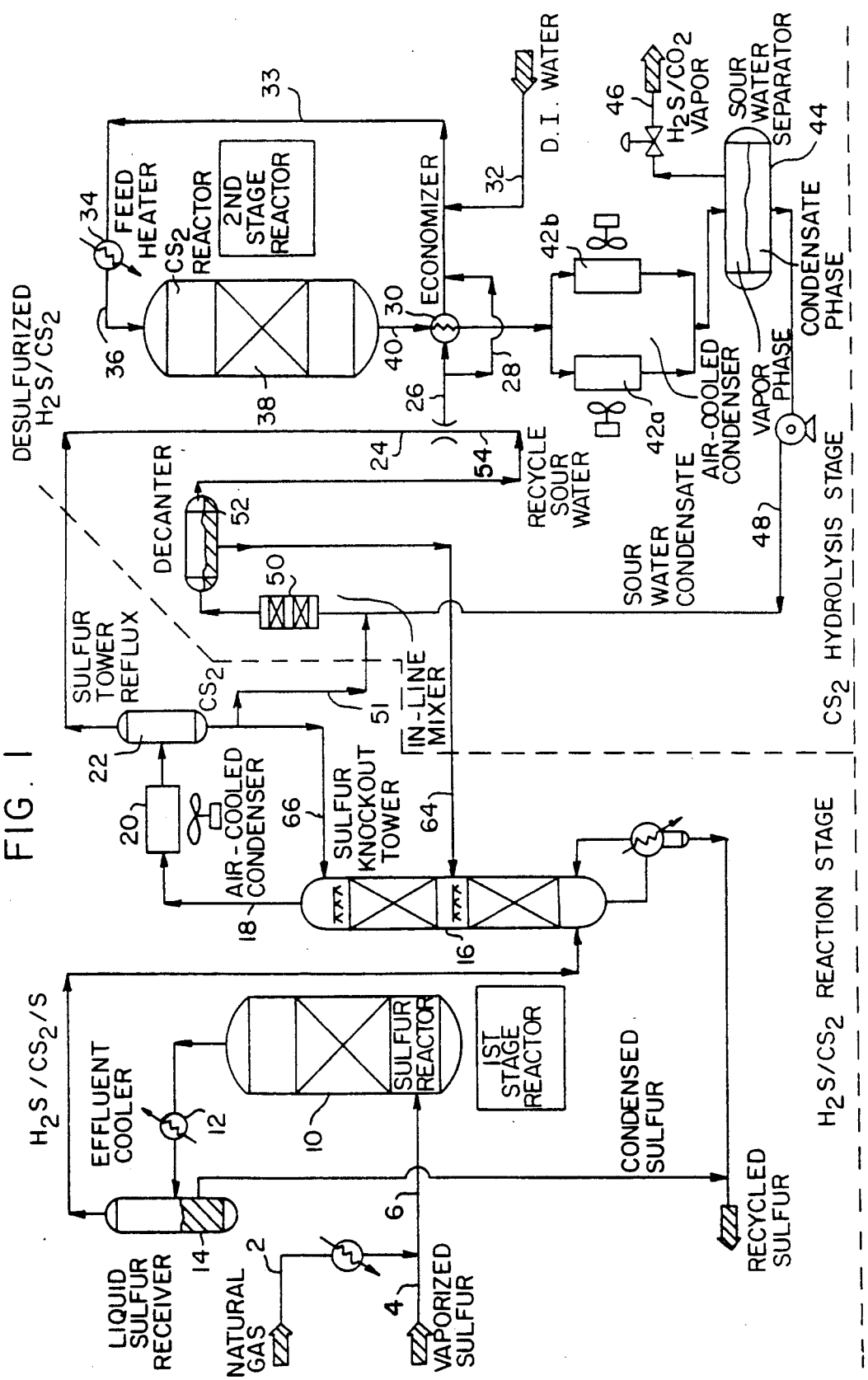
FIG. 1 is a schematic illustration of an embodiment of the process of the invention.

Referring to FIG. 1, a preferred embodiment of the inventive process is schematically shown. The invention may be used as a one-stage process wherein CS$_2$ is converted to H$_2$S by hydrolysis. Alternatively, the invention may be used as a two-stage process wherein H$_2$S and CS$_2$ are initially formed from the reaction of natural gas and sulfur, and CS$_2$ is thereafter converted to additional H$_2$S by hydrolysis.

The one-stage process involves the conversion of CS$_2$ to H$_2$S by hydrolysis of a substantial portion of the CS$_2$. A preferably substantially desulfurized H$_2$S/CS$_2$ mixture 24, containing from about 6 to about 100 mol% CS$_2$, is combined with water, such as recycled sour water 54, to form a feed mixture 26. The feed mixture 26 is advantageously maintained at a pressure of about 49 psig (3.4 kg/cm$^2$), for example, in order to create sufficient back pressure for driving the remaining steps of the conversion process. It has been found that a feed mixture pressure of about 49 psig (3.4 kg/cm$^2$) produces a pressure of about 35 psig (2.5 kg/cm$^2$) at the H$_2$S vapor outlet downstream once the pressure drop across the system has occurred. However, the pressure selected is not critical to the invention. The feed mixture 26 is advantageously maintained at a temperature of about 132° F. (55.5° C.), for example, so that it may function as a heat sink downstream.

Thereafter, the feed mixture 26 is passed through a CS$_2$ reactor economizer 30 which heats the feed mixture to a temperature of about 234° F. (112° C.), for example. The economizer 30 acts as a heat exchanger wherein the feed mixture 26 is heated by a hydrolysis reaction vapor product stream 40, described in more detail later. Conversely, vapor product stream 40 is cooled, such as by being placed in heat exchange relationship with feed mixture 26. The volume of feed mixture 26 which is passed through economizer 30 is controlled by a by-pass stream 28. The greater the volume of feed mixture 26 which is by-passed around economizer 30, the smaller the temperature rise of feed mixture 26 and the smaller the temperature depression of vapor product stream 40. In this manner, the temperature of vapor product stream 40 can be maintained at a desired value by regulating the volume of feed mixture 26 that is by-passed around economizer 30 through by-pass stream 28.

Make-up water 32, which is substantially unadulterated, is advantageously added to the heated feed mixture 26 to form a hydrolysis reactor feed 33. The amount of make-up water added is that which is necessary to replace (1) the water consumed through reaction with CS$_2$ and (2) the water lost with removal of the H$_2$S/CO$_2$ vapor product. The particular amount required is determined primarily by the system capacity, and may be readily determined by those skilled in the art. Deionized water is preferably used to minimize the amount of impurities that may be introduced into feed mixture 26.

The hydrolysis reactor feed 33 is advantageously preheated by at least one feed heater 34 in order to raise the temperature of the reactor feed 33 to at least about 360° F. (182° C.). The hydrolysis reaction will not occur below this temperature. Preferably, the hydrolysis reactor feed 33 is preheated to about 390° F. (199° C.). The preheated reactor feed 36 is sent to a fixed bed CS$_2$ hydrolysis reactor 38 which contains an alumina-based catalyst. Such catalysts are known to those skilled in the art. For example, Alcoa F-200 and H-152 activated alumina manufactured by Alcoa Chemicals Division, Pittsburgh, Pa. may be used as suitable hydrolysis catalysts.

The hydrolysis reactor 38 provides a hydrolysis reaction vapor product 40 comprising H$_2$S CO$_2$, unreacted H$_2$O, small amounts of sulfur and unconverted CS$_2$ according to the following reaction of equation (IV):

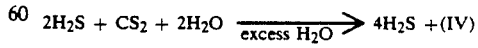

$$2H_2S + CS_2 + 2H_2O \xrightarrow{\text{excess } H_2O} 4H_2S + (IV)$$

CO$_2$ + unconverted CS$_2$ + unreacted H$_2$O + small amounts of sulfur

The hydrolysis reaction is extremely exothermic and if not suitably controlled will initiate side reactions that produce greater amounts of COS and sulfur. In particular, even at temperatures of about 700° F. (371° C.), small amounts of sulfur are produced according to the following reactions:

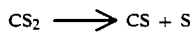 (V)

 (VI)

 (VII)

However, by maintaining the vapor product stream 40 leaving hydrolysis reactor 38 at a temperature no higher than about 750° F. (399° C.), preferably no higher than about 700° F. (371° C.), COS formation is minimized. Thus, the temperature of the hydrolysis reaction is advantageously maintained in the range of from about 360° F. (182° C.) to about 750° F. (399° C.), preferably from about 390° F. (199° C.) to about 700° F. (371° C.).

The hydrolysis reactor 38 is used to convert a substantial portion (i.e., greater than 95 weight percent of the $CS_2$) to $H_2S$. Typically, substantial conversion of $CS_2$ to $H_2S$ is possible where $CS_2$ is present within the $H_2S/CS_2$ mixture from about 6 to about 100 mole percent. The weight percentage of unconverted $CS_2$ can be controlled by varying the space velocity of the reactor. Those skilled in the art understand space velocity to mean the ratio of the volumetric feed rate to the designed volume of the reactor. Space velocity as shown in the subsequent examples is defined as follows:

$$CS_2 \text{ Molar Space Velocity} = F_i C_{iF}/V_R$$

where
- $F_i$ = the volumetric feed rate to the reactor per day.
- $V_R$ = the volume of the reactor expressed as kilograms of catalyst.
- $C_{iF}$ = the concentration of $CS_2$ in the feed as moles of $CS_2$ per unit volume.

After the hydrolysis vapor product stream 40 is formed, it is cooled to form a $H_2S/CO_2$ vapor phase and a sour water condensate phase. Accordingly, vapor product stream 40 may be cooled in a first cooling step to a temperature greater than the solidification point of sulfur, and then cooled in a second cooling step to a temperature no lower than about 30° C. to form a $H_2S/CO_2$ vapor phase and sour water condensate phase.

With this object in mind, vapor product stream 40 is thus cooled for a first time by passage through economizer 30. As set forth above, feed mixture 26 is used as a heat sink to cool the hydrolysis vapor product stream 40. The vapor product stream 40 should not be cooled in economizer 30 to the point where the small amounts of sulfur contained in the vapor product begin to solidify. Solidification of the sulfur may cause economizer plugging. Since the melting point of elemental sulfur is approximately 248° F. (120° C.), the vapor product stream 40 should be maintained slightly above this temperature to ensure that the sulfur does not begin to solidify in economizer 30. Preferably, vapor product stream 40 is cooled to a temperature in the range of from about 248° F. (120° C.) to about 300° F. (149° C.), preferably from about 248° F. to about 260° F. (127° C.), in economizer 30.

The cooled vapor product 40 is then passed through one of two air cooled condensers 42a and 42b which are arranged in parallel. These condensers advantageously cool the vapor product 40 for a second time to a temperature from about 86° F. (30° C.) to about 140° F. (60° C.) in order to form a partial condensate from the water which is unreacted by hydrolysis and remains in vapor product 40. Preferably, the vapor product 40 is cooled for the second time to about 119° F. (48° C.). Since 119° F. (48° C.) is below the melting point of elemental sulfur (i.e., 248° F./120° C.), the air cooled condensers 42a and 42b are arranged in parallel so that if one condenser happens to plug from the accumulation of solid sulfur, the other condenser can be put into service to cool vapor product 40 while the inoperative condenser is maintained off stream to be cleaned.

Thereafter, the twice-cooled vapor product is collected in a sour water separator 44 in order to form a discrete vapor phase 46 comprising $H_2S$ and $CO_2$, which is saturated with water, and a discrete sour water condensate phase 48 comprising unreacted $H_2O$ and small amounts of solid sulfur particles. Unreacted $CS_2$ may be present in either phase, although it is more likely that it will remain in the $H_2S/CO_2$ vapor phase 46. Sour water separator 44 is advantageously in the form of a large holding tank which facilitates the phase separation of the $H_2S/CO_2$ vapor phase 46 from the sour water condensate phase 48. The $H_2S/CO_2$ vapor phase is recovered as a top product and preferably sent to dryers for water removal and to a distillation column (not shown) in order to separate $H_2S$ from $CO_2$. Procedures for separating $H_2S$ from $CO_2$ are known to those skilled in the art and need not be described herein. The solid sulfur particles contained in the sour water condensate 48 are generally present at a concentration of about 220 ppm and range in size from about 3 microns to fairly large particles.

Sour water condensate 48 is pumped to a decanter 52 through an inline mixer 50 where the sour water condensate is separated into a $CS_2$ bottom layer containing dissolved sulfur and an upper substantially sulfur-free sour water layer. Just before inline mixer 50, additional $CS_2$ is added to the sour water condensate 48 through reflux stream 51. Preferably, the amount of $CS_2$ added is sufficient to obtain a sour water/$CS_2$ weight ratio of from about 25:1 to about 1:4. The temperature should be below the boiling point of $CS_2$, 46° C. The additional $CS_2$ completely dissolves the solid sulfur particles which are present in the sour water condensate phase 48. The upper substantially sulfur-free sour water layer is drawn off from decanter 52 as sour water stream 54, recycled and combined with the substantially desulfurized $H_2S/CS_2$ mixture 26 as hereinbefore described. The $CS_2$ bottom layer, containing dissolved sulfur from decanter 52, is sent via stream 64 to a sulfur removal device, such as sulfur knock-out tower 16, for further sulfur removal and recovery. Procedures for recovering sulfur from $CS_2$ are known to those skilled in the art and are described more fully below.

By recycling a large quantity of sour water 54 to be mixed with the desulphurized $H_2S/CS_2$ mixture 26, the overall temperature rise across the hydrolysis reactor 38 can be minimized (e.g., about 310° F./154° C.). In effect, the recycled sour water stream 54 acts as a heat sink which regulates the outlet temperature of the vapor product stream 40 thereby minimizing COS formation and equipment corrosion. Typically, with an $H_2S/CS_2$ mixture 26 containing 2 moles $H_2S$ per mole of $CS_2$, the reactor outlet temperature can be maintained at about 700° F. (371° C.) by using an "R" value (total moles of water fed to the hydrolysis reactor per mole of $CS_2$ fed) of about 7.2. The total amount of water fed to the reactor comprises the combination of the sour water stream 54 and make-up water stream 32. Therefore, sufficient water should be added as make-up water stream 32 to ensure that the total water fed to the reaction is 7.2 moles per mole of $CS_2$. Moreover, COS formation, corrosion and equipment plugging are minimized by recycling a large quantity of sour water 26 upstream of the hydrolysis reactor 38 to act as a heat sink.

A reactor outlet temperature below 700° F. may be obtained by establishing an R value greater than 7.2, assuming the $H_2S/CS_2$ molar feed ratio remains at 2:1. For a mixture comprising 100% $CS_2$, the R value for maintaining a 700° F. reactor outlet temperature is 9.6. Determination of the appropriate R value for a particular $H_2S/CS_2$ reactor feed ratio and target outlet temperature is readily determinable by those skilled in the art. For a reactor feed comprising from about 6 to about 100 mol% $CS_2$, the R value may typically range from about 2.5 to about 30, for outlet temperatures from 500° to 750° F. An R value of 2.5 corresponds to a 25% water molar excess over the stoichiometric water:$CS_2$ feed ratio of 2:1. An R value of 30 corresponds to a reactant feed comprising 100% $CS_2$, and a reactor outlet temperature of 500° F. R values outside the recommended range may be selected, depending on the targeted outlet temperature.

The above-described process provides substantially complete $CS_2$ conversion to $H_2S$ under conditions where a relatively low temperature rise (i.e., 310° F./154° C.) occurs across the hydrolysis reactor 38. This is made possible by regulating the amount of excess water added for hydrolysis. The problems inherent in the prior art are substantially overcome.

In another aspect of the invention, the process may be used as a two-stage process wherein $H_2S$ and $CS_2$ are initially formed in a first stage elevated temperature reactor 10 from the reaction of heated natural gas 2 (i.e., substantially methane) and vaporized sulfur 4. The second stage of the process relates to the conversion of $CS_2$ to $H_2S$ in the manner previously described.

According to the first stage, natural gas 2 and vaporized sulfur 4 are mixed to form stream 6 prior to entering reactor 10. Advantageously, the mixture forming stream 6 enters reactor 10 at a temperature of about 1253° F. (678° C.) and a pressure of about 58 psig (4.0 kg/cm²), for example. It has been found that a pressure of 58 psig (4.0 kg/cm²) provides a back-pressure which is sufficient to drive the two stage process so that the pressure of the $H_2S/CO_2$ vapor 46 leaving the system is maintained at about 35 psig (2.5 kg/cm²). However, the pressure selected is not critical to the invention. The first stage $H_2S/CS_2$ reaction is set forth in equation (VIII) as follows:

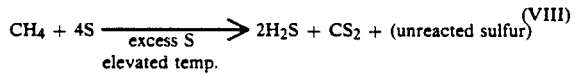
(VIII)

According to the reaction equation, 2 moles of $H_2S$ are formed for every one mole of $CS_2$. Typically, the reactor co-products leave reactor 10 at about 1100° F. (593° C.).

The reactor co-products from reactor 10 are then cooled to, e.g., about 300° F. (149° C.) by at least one effluent cooler 12. The major portion of the unreacted sulfur contained in the reaction co-product is removed from the remaining $H_2S/CS_2$ by decantation in a liquid sulfur receiver 14 and subsequent scrubbing with a reflux steam of $CS_2$ in a packed sulfur knock-out tower 16. Preferably, the reaction product entering sulfur knock-out tower 16 is maintained at about 300° F. (149° C.) and about 53 psig (3.7 kg/cm²). The removed sulfur is drained by gravity and recycled to a sulfur feed tank for reuse in reactor 10.

Advantageously, the desulfurized $H_2S/CS_2$ mixture 18 leaves tower 16 at about 183° F. (84° C.) and 52 psig (3.7 kg/cm²). The desulfurized $H_2S/CS_2$ mixture 18 leaving the sulfur knock-out tower 16 is passed through an air cooled condenser 20 in order to condense a portion of the $CS_2$ contained therein and then into a sulfur tower reflux drum 22. Advantageously, the temperature of the $H_2S/CS_2$ mixture held in reflux drum 22 is maintained at about 143° F. (62° C.). The condensed portion of $CS_2$ in reflux drum 22 is recycled to the sulfur knock-out tower 16 through stream 66 and to the sour water condensate stream 48 through stream 51. The portion of the desulfurized $H_2S/CS_2$ mixture within the reflux drum 22 which has not condensed is drawn off as a desulfurized $H_2S/CS_2$ top product stream 24 and combined with recycled sour water stream 54 to form feed mixture 26 as substantially described above. Feed mixture 26 is then treated under conditions as substantially described above, in order to convert $CS_2$ to additional $H_2S$.

The following four non-limiting examples are intended to illustrate the practice of the invention. Each example utilizes a different hydrolysis reactor $CS_2$ molar space velocity. While each of the four $CS_2$ molar space velocities utilized is acceptable for carrying out the inventive hydrolysis reaction process, a $CS_2$ molar space velocity of 185.5 gram moles $CS_2$ per kilogram catalyst per day (Example 1) is preferred. It should be noted that substantial conversion of $CS_2$ to additional $H_2S$ is particularly preferred, since $CS_2$ generally interferes in synthesis reactions where $H_2S$ is one of the reactants.

EXAMPLE 1

A feed mixture of $CS_2$ (1.11 gram moles/hour), water (8.66 gram moles/hour) and $H_2S$ (2.22 gram moles/hour) was heated to 390°–400° F. and passed through Alcoa H-152 catalyst at a $CS_2$ molar space velocity of 185.5 gram moles $CS_2$ per kilogram catalyst per day. The reaction pressure was controlled at 60 psig (4.2 kg/cm²) and a reaction temperature of 699° F. (370° C.) was maintained near the top of the catalyst bed. The reactor effluent was cooled to 117° F. (47° C.) and the condensed sour water was separated from the product vapor. Under these conditions the conversion of $CS_2$ was essentially quantitative with an average molar product vapor composition of 0.01% $CS_2$; 0.04% COS; 1.11% $H_2O$; 77.14% $H_2S$ and 19.14% $CO_2$. The sulfur, carbon and overall mass balances were 97.6%, 97.0% and 99.2% respectively. Some elemental sulfur was observed in the condensed sour water in the form of a fine suspension which eventually settled in the form of flakes.

EXAMPLE 2

A feed mixture of $CS_2$ (1.09 gram moles/hour), water (8.72 gram moles/hour) and $H_2S$ (2.22 gram moles/hour) was heated to 463° F. and passed through Alcoa H-152 catalyst at a $CS_2$ molar space velocity of 364.3 gram moles $CS_2$ per kilogram catalyst per day. The reaction pressure was controlled at 60 psig (4.2 kg/cm$^2$) and a reaction temperature of 702° F. (372° C.) was maintained near the top of the catalyst bed. The reactor effluent was cooled to 101° F. (38° C.) and the condensed sour water was separated from the product vapor. Under these conditions the conversion of $CS_2$ was essentially quantitative with an average molar product vapor composition of 0.02% $CS_2$; 0.04% COS; 0.5% $H_2O$; 78.57% $H_2S$ and 19.56% $CO_2$. The sulfur, carbon and overall mass balances were 98.6%, 99.3% and 99.1% respectively. Some elemental sulfur was observed in the condensed sour water in the form of a fine suspension which eventually settled in the form of flakes.

EXAMPLE 3

A feed mixture of $CS_2$ (2.23 gram moles/hour), water (16.98 gram moles/hour) and $H_2S$ (4.45 gram moles/hour) was heated to 442° F. (228° C.) and passed through Alcoa H-152 catalyst at a $CS_2$ molar space velocity of 743.3 gram moles $CS_2$ per kilogram catalyst per day. The reaction pressure was controlled at 60 psig (4.2 kg/cm$^2$) and a reaction temperature of 698° F. (370° C.) was maintained in the middle of the catalyst bed. The reactor effluent was cooled to 97° F. (36° C.) and the condensed sour water was separated from the product vapor. Under these conditions 97.49% of the $CS_2$ was converted and the average molar product vapor composition analyzed 0.50% $CS_2$; 0.06% COS; 0.46% $H_2O$; 78.46% $H_2S$ and 19.8% $CO_2$. The sulfur, carbon and overall mass balances were 100.3%, 102.4% and 98.8% respectively. Some elemental sulfur was observed in the condensed sour water in the form of a fine suspension (particle size distribution 4–43 microns) which eventually settled in the form of flakes. The amount of sulfur present was 0.018 grams per gram mole of $CS_2$ feed.

EXAMPLE 4

A feed mixture of $CS_2$ (3.33 gram moles/hour), water (25.91 gram moles/hour) and $H_2S$ (6.77 gram moles/hour) was heated to 403° F. (206° C.) and passed through Alcoa H-152 catalyst at a $CS_2$ molar space velocity of 1110 gram moles $CS_2$ per kilogram catalyst per day. The reaction pressure was controlled at 60 psig (4.2 kg/cm$^2$) and a reaction temperature of 698° F. (370° C.) was maintained near the top of the catalyst bed. The reactor effluent was cooled to 109° F. (43° C.) and the condensed sour water was separated from the product vapor. Under these conditions 96.36% of the $CS_2$ was converted and the average molar product vapor composition analyzed 0.73% $CS_2$; 0.07% COS; 0.47% $H_2O$; 77.03% $H_2S$ and 19.3% $CO_2$. The sulfur, carbon and overall mass balances were 97.1%, 100.1% and 99% respectively. Some elemental sulfur was observed in the condensed sour water in the form of a fine suspension which eventually settled in the form of flakes.

The operating conditions in the foregoing description of FIG. 1 are for illustration only, and should not be construed as limiting the scope of the invention.

The present invention may be embodied in other specific forms without departing from the spirit or essential attributes thereof and, accordingly, reference should be made to the appended claims, rather than to the foregoing specification, as indicating the scope of the invention.

I claim:

1. A process for converting $CS_2$ to $H_2S$ by hydrolysis comprising the steps of:
    (a) combining $CS_2$, or a $H_2S/CS_2$ mixture containing on a mole percent basis from about 6% to about 100% $CS_2$, with water to form a feed mixture;
    (b) converting a substantial portion of the $CS_2$ in the mixture by hydrolysis to a hydrolysis reaction vapor product comprising $H_2S$, $CO_2$, sulfur and unconverted $CS_2$;
    (c) cooling the hydrolysis reaction vapor product to form a $H_2S/CO_2$ vapor phase and a sour water condensate phase;
    (d) separating the $H_2S/CO_2$ vapor phase from the sour water condensate phase; and
    (e) recycling sour water from the sour water condensate phase to the feed mixture in (a).

2. A process according to claim 1 wherein the water forming the feed mixture further comprises unadulterated water added to the feed mixture.

3. A process according to claim 1 comprising the further steps of
    (f) mixing the sour water condensate with additional $CS_2$ to form a sour water phase and a $CS_2$ phase containing dissolved sulfur;
    (g) separating the sour water phase from the $CS_2$ phase; and
    (h) recycling the sour water phase to the $CS_2$ or $H_2S/CS_2$ mixture in step (a).

4. A process according to claim 3 wherein the step of cooling the hydrolysis reaction vapor product to form the $H_2S/CS_2$ vapor phase and sour water condensate phase comprises:
    (i) cooling the hydrolysis reaction vapor product in a first cooling step to a temperature greater than the solidification point of sulfur; and
    (ii) cooling the vapor product in a second cooling step to a temperature no lower than about 30° C. to form a $H_2S/CO_2$ vapor phase and sour water condensate phase.

5. A process according to claim 3 wherein the sour water phase formed in step (f) is substantially sulfur-free.

6. A process according to claim 3 wherein the $CS_2$ is converted to the hydrolysis reaction vapor product in a fixed bed hydrolysis reactor containing a catalyst.

7. A process according to claim 6 wherein the catalyst comprises activated alumina.

8. A process according to claim 4 wherein the hydrolysis reaction vapor product is cooled in the first cooling step to a temperature within the range of from about 120° C. to about 149° C.

9. A process according to claim 8 wherein the hydrolysis reaction vapor product is cooled in the first cooling step to a temperature within the range of from about 120° C. to about 127° C.

10. A process according to claim 4 wherein the hydrolysis reaction vapor product is cooled in the first cooling step by passing the vapor product into heat exchange contact with the feed mixture of step (a).

11. A process according to claim 8 wherein the hydrolysis reaction vapor product is cooled in the second cooling step to a temperature within the range of from about 30° C. to about 60° C.

12. A process according to claim 3 further comprising the step of recycling the $CS_2$ phase to a sulfur removal device.

13. A process according to claim 2 further comprising the step of preheating the feed mixture and added water to a temperature of about 199° C. before converting a substantial portion of the $CS_2$ to $H_2S$ by hydrolysis.

14. A process according to claim 3 wherein the $CS_2$ is converted to $H_2S$ by hydrolysis at a temperature up to about 371° C.

15. A process for converting $CS_2$ to $H_2S$ by hydrolysis in a $H_2S/CS_2$ mixture comprising the steps of:
    (a) reacting natural gas with excess sulfur at elevated temperature to form a $H_2S/CS_2$ reaction product comprising $H_2S$, $CS_2$ and unreacted sulfur;
    (b) removing the unreacted sulfur from the $H_2S/CS_2$ reaction product to form a substantially desulfurized $H_2S/CS_2$ mixture;
    (c) combining the substantially desulfurized $H_2S/CS_2$ mixture with water to form a feed mixture containing on a mole percent basis at least about 6% $CS_2$;
    (d) converting a substantial portion of the $CS_2$ in the feed mixture by hydrolysis to a hydrolysis reaction vapor product comprising $H_2S$, $CO_2$, sulfur and unconverted $CS_2$;
    (e) cooling the hydrolysis reaction vapor product to form a $H_2S/CO_2$ vapor phase and a sour water condensate phase;
    (f) separating the $H_2S/CO_2$ vapor phase from the sour water condensate phase; and
    (g) recycling sour water from the sour water condensate phase to the feed mixture in (c).

16. A process according to claim 15 wherein the $H_2S/CS_2$ reaction product contains about two moles of $H_2S$ per mole of $CS_2$.

17. A process according to claim 15 further comprising adding unadulterated water to the feed mixture formed in step (c).

18. A process according to claim 15 comprising the further steps of
    (h) mixing the sour water condensate with additional $CS_2$ to form a sour water phase and a $CS_2$ phase containing dissolved sulfur;
    (i) separating the sour water phase from the $CS_2$ phase; and
    (j) recycling the sour water phase to the $H_2S/CS_2$ mixture in step (c).

19. A process according to claim 18 wherein the step of cooling the hydrolysis reaction vapor product to form the $H_2S/CO_2$ vapor phase and sour water condensate phase comprises:
    (i) cooling the hydrolysis reaction vapor product in a first cooling step to a temperature greater than the solidification point of sulfur; and
    (ii) cooling the vapor product in a second cooling step to a temperature no lower than about 30° C. to form a $H_2S/CO_2$ vapor phase and sour water condensate phase.

20. A process according to claim 18 wherein the $CS_2$ is converted in a fixed bed hydrolysis reactor containing a catalyst.

21. A process according to claim 20 wherein the catalyst comprises activated alumina.

22. A process according to claim 19 wherein the hydrolysis reaction vapor product is cooled in the first cooling step to a temperature within the range of from about 120° C. to about 149° C.

23. A process according to claim 22 wherein the hydrolysis reaction vapor product is cooled in the first cooling step to a temperature within the range of from about 120° C. to about 127° C.

24. A process according to claim 22 wherein the vapor product is cooled in the second cooling step to a temperature within the range of from about 30° C. to about 60° C.

25. A process according to claim 19 wherein the hydrolysis reaction vapor product is cooled in the first cooling step by passing the vapor product into heat exchange contact with the feed mixture of step (c).

26. A process according to claim 15 further comprising the step of recycling the $CS_2$ phase to a sulfur removal device.

27. A process according to claim 17 further comprising the step of preheating the feed mixture and added water up to a temperature of about 199° C. before converting a substantial portion of the $CS_2$ by hydrolysis.

28. A process according to claim 18 wherein the $CS_2$ is converted by hydrolysis at a temperature up to about 371° C.

* * * * *